US012594569B2

(12) United States Patent
Wei et al.

(10) Patent No.: US 12,594,569 B2
(45) Date of Patent: Apr. 7, 2026

(54) MATERIAL REMOVAL DEVICE AND METHOD FOR BATTERY ELECTRODE PLATE

(71) Applicant: BYD COMPANY LIMITED, Guangdong (CN)

(72) Inventors: Hao Wei, Shenzhen (CN); Zhike Yang, Shenzhen (CN); Beijun Zhong, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 86 days.

(21) Appl. No.: 18/541,338

(22) Filed: Dec. 15, 2023

(65) Prior Publication Data

US 2024/0109093 A1 Apr. 4, 2024

Related U.S. Application Data

(63) Continuation of application No. PCT/CN2022/100196, filed on Jun. 21, 2022.

(30) Foreign Application Priority Data

Jul. 1, 2021 (CN) .......................... 202110744365.5

(51) Int. Cl.
*B05B 13/02* (2006.01)
*B05B 14/30* (2018.01)
(Continued)

(52) U.S. Cl.
CPC .............. *B05B 13/02* (2013.01); *B05B 14/30* (2018.02); *B05C 5/02* (2013.01); *H01M 4/04* (2013.01);
(Continued)

(58) Field of Classification Search
None
See application file for complete search history.

(56) References Cited

U.S. PATENT DOCUMENTS

2017/0170456 A1 6/2017 Zhang et al.

FOREIGN PATENT DOCUMENTS

CN 1572015 A 1/2005
CN 101728520 A 6/2010
(Continued)

OTHER PUBLICATIONS

International Search Report and Written Opinion for Application No. PCT/CN2022/100196, mailed on Aug. 26, 2022, 10 pages.
(Continued)

*Primary Examiner* — Levon J Shahinian
(74) *Attorney, Agent, or Firm* — Sheppard Mullin Richter & Hampton LLP

(57) ABSTRACT

A device for removing a coating material from a battery electrode plate is provided. The battery electrode plate includes a current collector and a coating material attached to a surface of the current collector. The device includes a housing, a spraying port, and a suction port. The housing includes a side plate. A hollow space is defined by the side plate. The side plate is configured to be in contact with the current collector to isolate a portion of the coating material in the hollow space. The spraying port is located in the hollow space, and configured to be in communication with a liquid source to spray a liquid onto the portion of the coating material to dissolve the coating material. The suction port is located in the hollow space and configured to be in communication with a vacuum generation device to suck the dissolved coating material away from the current collector.

18 Claims, 4 Drawing Sheets

(51) Int. Cl.

| | |
|---|---|
| *B05C 5/02* | (2006.01) |
| *H01M 4/04* | (2006.01) |
| *H01M 4/139* | (2010.01) |
| *H01M 10/0525* | (2010.01) |
| *H01M 10/058* | (2010.01) |
| *H01M 50/531* | (2021.01) |
| *H01M 50/536* | (2021.01) |

(52) U.S. Cl.
CPC ......... *H01M 4/0404* (2013.01); *H01M 4/139* (2013.01); *H01M 10/058* (2013.01); *H01M 50/531* (2021.01); *H01M 50/536* (2021.01); *H01M 10/0525* (2013.01); *Y02E 60/10* (2013.01)

(56) References Cited

FOREIGN PATENT DOCUMENTS

| | | | |
|---|---|---|---|
| CN | 109465251 A | 3/2019 |
| CN | 110665661 A | 1/2020 |
| CN | 111509185 A | 8/2020 |
| CN | 111992420 A | 11/2020 |
| CN | 111992420 B | 7/2021 |
| FR | 2673045 A1 | 8/1992 |
| GB | 2253557 A | 9/1992 |
| JP | H08167410 A | 6/1996 |
| JP | H11260354 A | 9/1999 |
| JP | 2003201587 A | 7/2003 |
| JP | 2018085206 A | 5/2018 |
| KR | 10-2017-0036004 A | 3/2017 |

OTHER PUBLICATIONS

Extended European Search Report for European Application No. 22831782.2 mailed on May 22, 2025 .

International Preliminary Report on Patentability Chapter I for International Application No. PCT/CN2022/100196 mailed on Jan. 11, 2024.

Office Action for Korean Application No. 10-2023-7044178 mailed on Aug. 7, 2025.

Examination Report No. 1 for Australian Application No. 2022305557 mailed on Nov. 25, 2024.

First Office Action for Chinese Application No. 202110744365.5 mailed on Jul. 19, 2024.

Second Office Action for Chinese Application No. 202110744365.5 mailed on Nov. 11, 2024.

Office Action for Taiwanese Application No. 111124770 mailed on May 15, 2023.

Notice of Reasons for Refusal for Japanese Application No. 2023577886 mailed on May 19, 2025.

Decision to Grant a Patent for Japanese Application No. 2023577886 mailed on Jul. 1, 2025.

Office Action for Brazilian Application No. 112023027272 mailed on Sep. 23, 2024.

100

100

MATERIAL REMOVAL DEVICE AND METHOD FOR BATTERY ELECTRODE PLATE

CROSS-REFERENCE TO RELATED APPLICATION

This application is a Continuation application of International Patent Application No. PCT/CN2022/100196, filed on Jun. 21, 2022, which is based on and claims priority to and benefits of Chinese Patent Application No. 202110744365.5, filed on Jul. 1, 2021. The entire content of all of the above-referenced applications is incorporated herein by reference.

FIELD

The present disclosure relates to preparation of a battery electrode plate, and particularly to a material removal device and method for a battery electrode plate.

BACKGROUND

With the wide application of lithium-ion batteries, the research on performance optimization of lithium-ion batteries has attracted much attention. The improvement of energy density of lithium-ion batteries has always been the focus of attention. The improvement of energy density of lithium-ion batteries not only can be achieved from the perspective of the inherent properties of battery materials, but also can be achieved from the perspective of the structure of lithium-ion batteries. To improve the energy density of lithium-ion batteries and reduce the internal impedance of the battery caused by the battery structure, the position of the tab on the battery electrode plate in the lithium-ion battery begins to change from the position at the end of the electrode plate at the early stage to the middle position of the electrode plate, i.e., the coating area of the battery electrode plate. The change of the position of the tab means the change of the preparation method of the battery electrode plate. The tab is located in the coating area of the battery electrode plate. In the presence of an electrode coating, the tab cannot be soldered to the current collector of the electrode. Therefore, it is necessary to remove the coating material corresponding to the tab from the coating area first. At present, methods commonly used for removing the coating material include a mechanical scraping cleaning method, a chemical cleaning method, and a laser cleaning method. However, for the mechanical scraping cleaning method, because a metal scraper is used to directly contact the surface of current collector, certain production risks are caused. Moreover, when the gap between the scraper and the battery electrode plate is too large, the residual coating is difficult to clean. When the gap between the scraper and the battery electrode plate is too small, scratching or even breakage of the current collector of the battery is caused, and the powder produced in scraping sticks to the battery electrode plate and leads to an increased defect rate in the preparation of battery electrode plates. The chemical cleaning method causes certain pollution to the environment, and has the problems such as poor working environment and low production efficiency. For the laser cleaning method, due to the uneven distribution of laser energy, the battery electrode plate is likely to be damaged, and the surface of the electrode plate is easily oxidized, resulting in reduced strength. Therefore, it is necessary to adopt a better method to remove the coating material in a region on the battery electrode plate.

SUMMARY

To solve the technical problem that various disadvantages exist in the methods for removing the coating material of the battery electrode plate in the related art, the present disclosure provides a device and method for removing a coating material from a battery electrode plate. With the use of the material removal device for a battery electrode plate to remove materials, the coating material at the position where the tab needs to be soldered on the battery electrode plate can be efficiently and effectively removed, thereby greatly reducing the degree of damage to the current collector and the residue of the coating material on the current collector after removal.

To achieve the above objectives, according to a first aspect, the present application provides a device and method for removing a coating material from a battery electrode plate. The battery electrode plate includes a current collector and a coating material attached to a surface of the current collector. The device includes a housing, a spraying port, and a suction port.

The housing includes a side plate. A hollow space is defined by the side plate. The side plate is configured to be in contact with the current collector to isolate a portion of the coating material in the hollow space.

The spraying port is located in the hollow space, and configured to be in communication with a liquid source to spray a liquid onto a portion of the coating material to dissolve the portion of the coating material, so that fluidity of the coating material of the predetermined region is increased.

The suction port is located in the hollow space and configured to be in communication with a vacuum generation device to suck the dissolved coating material away from the current collector.

In an embodiment of the present disclosure, the housing further includes a top plate, the side plate is disposed at a periphery of the top plate, and the side plate is configured to be in contact with the current collector to seal the hollow space.

In an embodiment of the present disclosure, the suction port has a suction port surface enclosing a channel in communication with the hollow space, and the suction port surface is at least partially of a bell shape having an opening facing the hollow space.

In an embodiment of the present disclosure, the side plate includes an inner side plate and an outer side plate, the inner side plate and the outer side plate are spaced apart to form a suction pipe, the suction pipe is in communication with the suction port, and one end of the outer side plate close to the battery electrode plate is configured to be in contact with the current collector.

In an embodiment of the present disclosure, the side plate includes an inner side plate and an outer side plate, the top plate includes an inner top plate and an outer top plate, the inner side plate is connected to the inner top plate to form an inner wall of a suction pipe, the outer side plate is connected to the outer top plate to form an outer wall of the suction pipe, the inner wall of the suction pipe and the outer wall of the suction pipe form the suction pipe, the suction pipe is in communication with the suction port, and one end of the outer side plate close to the battery electrode plate is configured to be in contact with the current collector to seal the hollow space.

In an embodiment of the present disclosure, one end of the suction pipe close to the battery electrode plate forms the suction port.

In an embodiment of the present disclosure, the end of the inner side plate close to the battery electrode plate is configured to be in contact with the portion of the coating material and is spaced apart from the current collector to form the suction port.

In an embodiment of the present disclosure, a main spraying pipe is disposed in the top plate, the spraying port is formed on one side of the top plate close to the battery electrode plate, and the spraying port is in communication with the liquid source through the main spraying pipe to spray the liquid on the portion of the coating material.

In an embodiment of the present disclosure, the material removal device for a battery electrode plate further includes a spraying plate, the spraying plate being disposed in the hollow space, a plurality of spraying pipes in communication with the main spraying pipe being disposed in the spraying plate, and the spraying port being formed on one end of each of the spraying pipes away from the main spraying pipe.

Through the technical solutions, the material removal device for a battery electrode plate of the present disclosure can accurately remove the portion of the coating material of the predetermined region used for soldering the tab on the battery electrode plate. The housing included in the device can lock the predetermined region requiring removal of the coating material. The contact of the side plate in the housing with the current collector can separate the predetermined region requiring removal of the coating material from a non-predetermined region not requiring removal of the coating material. In this way, the coating material of the non-predetermined region is not removed during removal of the coating material of the predetermined region, thereby improving the precision of material removal. In addition, the material removal device for a battery electrode plate further includes the spraying port. The spraying port is in communication with the liquid source to spray the liquid on the predetermined region separated by the housing, so as to reduce the viscosity of the coating material of the predetermined region and facilitate the suction of the coating material in this region. Furthermore, the material removal device for a battery electrode plate further includes the suction port. The suction port can suck the low-viscosity coating material of the predetermined region away from the current collector. Compared with the mechanical scraping cleaning method, the chemical cleaning method, and the laser cleaning method in the related art, the suction of the coating material can greatly reduce the damage to the battery electrode plate and the residue of the coating material on the current collector, thereby improving the soldering yield of the tab on the current collector. Moreover, the material removal device for a battery electrode plate according to the present disclosure integrates the housing having positioning and isolation functions, the spraying port having a liquid spraying function, and the suction port having a coating material suction function, so that the coating material of the predetermined region of the battery electrode plate can be conveniently, quickly and efficiently removed, thereby improving the production efficiency of the battery electrode plate.

According to a second aspect, the present application provides a method for removing a coating material from a battery electrode plate, by the device for removing a coating material from a battery electrode plate, including the following steps:

placing the housing on the battery electrode plate, isolating a portion of the coating material in the hollow space by the side plate;

spraying a liquid through the spraying port in the hollow space onto the portion of the coating material to dissolve the portion of the coating material; and sucking the dissolved coating material away from the current collector through the suction port.

In an embodiment of the present disclosure, after the sucking the dissolved coating material away from the current collector through the suction port, the method further includes: spraying the liquid on the current collector from which the dissolved coating material is sucked away, and sucking the liquid away from the current collector through the suction port.

In an embodiment of the present disclosure, after the spraying the liquid on the current collector from which the dissolved coating material is sucked away, and sucking the liquid away from the current collector through the suction port, the method further includes: drying the battery electrode plate.

In an embodiment of the present disclosure, the spraying the liquid through the spraying port in the hollow space onto the portion of the coating material to dissolve the coating material includes spraying 1 g to 3 g of the liquid per square centimeter on the coating material.

In an embodiment of the present disclosure, a pressure in the hollow space is about 50 KPa to about 300 KPa.

Through the material removal method for a battery electrode plate, the coating material at the position where the tab needs to be arranged/disposed can be removed conveniently, quickly and effectively, to facilitate the soldering of the tab on the current collector, thereby improving the soldering yield of the tab.

Additional aspects and advantages of the present disclosure will be given in and apparent from the description below, or understood through practice of the present disclosure.

BRIEF DESCRIPTION OF THE DRAWINGS

FIG. 1-2 is a schematic diagram of a battery electrode plate having a tab located in a coating layer;

FIG. 2 is a schematic diagram of a material removal device for a battery electrode plate according to an embodiment of the present application;

Figure 1:
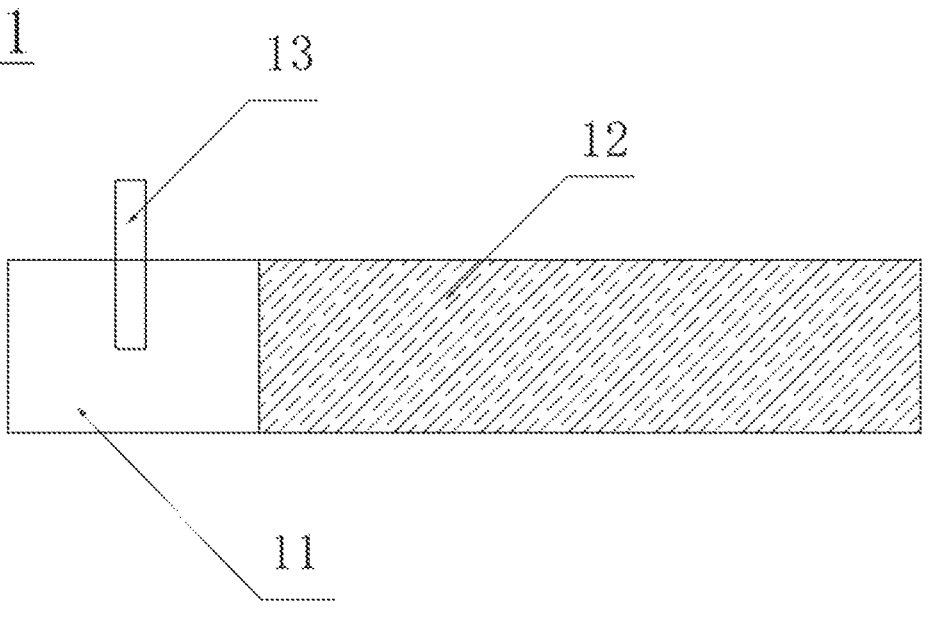
FIG. 1-1 is a schematic diagram of a battery electrode plate having a tab located at an end thereof.

LIST OF REFERENCE NUMERALS battery electrode plate 1, current collector 11, coating material 12, tab 13, predetermined region 14, material removal device 100 for battery electrode plate, housing/positioning member 2, side plate 21, inner side plate 211, outer side plate 212, hollow space 22, top plate 23, inner top plate 231, outer top plate 232, spraying port 3, suction port 4, suction pipe 5, main spraying pipe 6, spraying plate 7, spraying pipe 8, channel 41 of suction port in communication with hollow space, suction port surface 42, and beam 213.

DETAILED DESCRIPTION

To make the technical problems to be solved by the present disclosure, technical solutions, and beneficial effects more comprehensible, the following further describes the present disclosure in detail with reference to the accompanying drawings and embodiments. It should be understood that the embodiments described herein are merely used for explaining the present disclosure, and are not to limit the present disclosure.

Figures 1, 2:
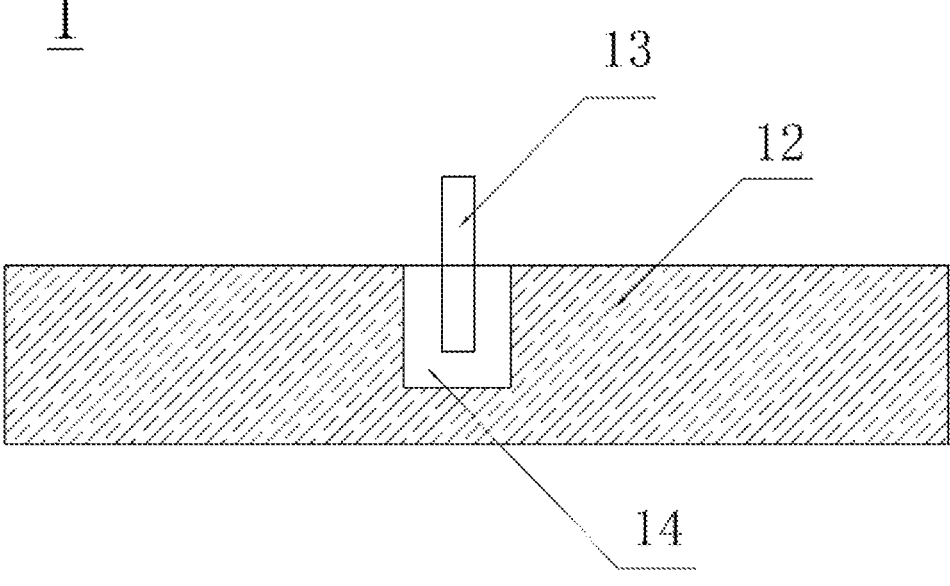
Figure 2:
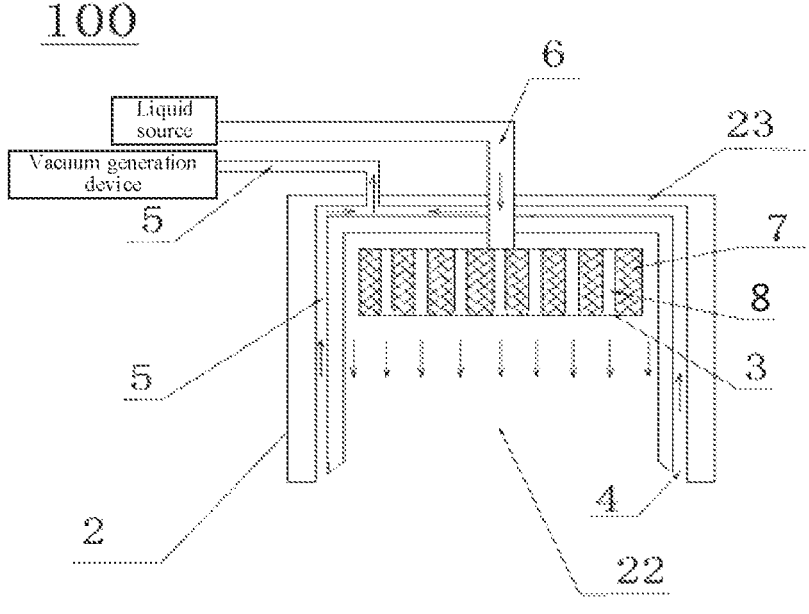

A lithium-ion battery includes a battery electrode plate. The battery electrode plate 1 includes a current collector 11, a coating material 12 attached to a surface of the current collector 11, and a tab 13 soldered to the current collector 11. Generally, as shown in FIG. 1-1, an end of the current collector 11 is a blank current collector configured for soldering the tab 13, and the other part of the current collector 11 is configured for coating the coating material 12. Taking a negative electrode plate as an example, when the lithium-ion battery discharges, electrons are transmitted to an external circuit through the current collector 11 and the tab 13. For the coating material away from the tab 13, the path of electron transmission to the external circuit is longer, and some heat is generated in the process of electron transmission, resulting in a loss of battery capacity and affecting the improvement of battery energy density. Therefore, to resolve this problem, the position of the tab 13 on the battery electrode plate 1 may be changed. As shown in FIG. 1-2, the position of the tab 13 is changed from the end of the current collector 1 to the middle portion of the current collector 11 or near the middle portion of the current collector 11, so that the path for transmission of electrons between the battery electrode plate 1 and the external circuit can be shortened, thereby reducing the loss of battery energy density caused by electron transmission, and improving the battery energy density. Because the tab 13 cannot be directly soldered to the coating material 12, the coating material 12 at the position where the tab is soldered needs to be removed to expose the current collector 11, so that the current collector 11 and the tab 13 can be soldered together.

Figure 3:
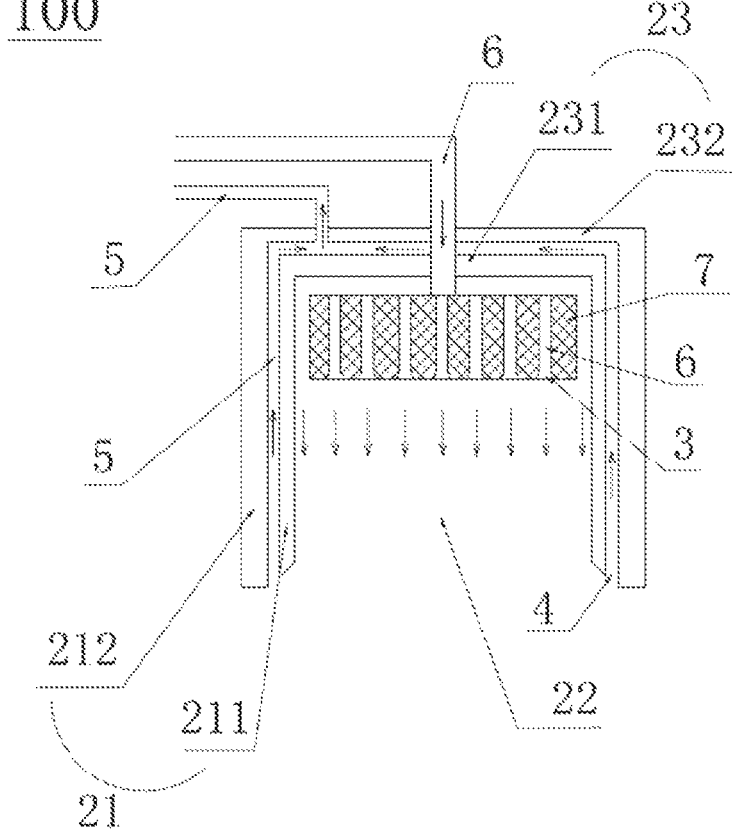
FIG. 3 is a schematic diagram of a material removal device for a battery electrode plate according to an embodiment of the present application.
Figure 4:
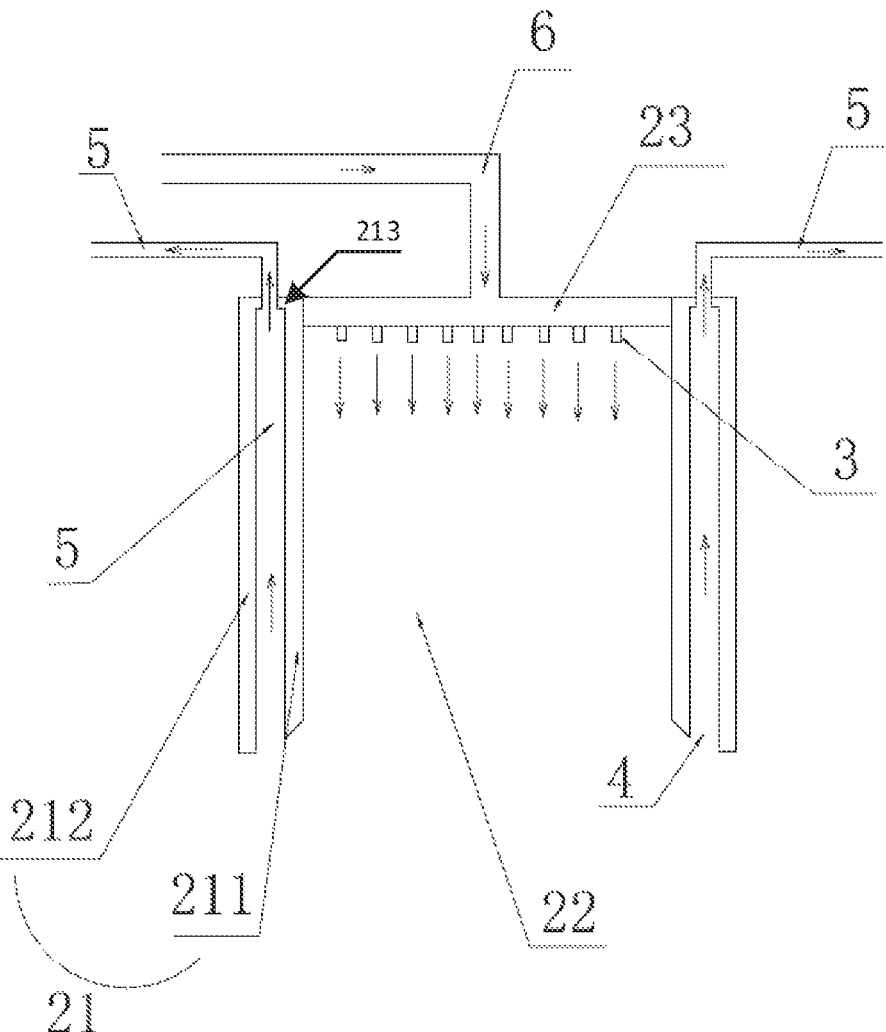
FIG. 4 is a schematic diagram of a material removal device for a battery electrode plate according to another embodiment of the present application.

Based on this, as shown in FIG. 2, FIG. 3, and FIG. 4, the present application provides a material removal device 100 for a battery electrode plate, which is configured to remove the portion of the coating material 12 of a predetermined region 14 of the battery electrode plate. The predetermined region 14 is a region for soldering the tab 13. The material removal device 100 for a battery electrode plate includes a housing/positioning member 2, a spraying port 3, and a suction port 4. The positioning member 2 includes a side plate 21. A space formed by the side plate 21 is defined as a hollow space 22. When the material removal device for a battery electrode plate is used to remove the coating material of the predetermined region 14 of the battery electrode plate, it is necessary to contact the positioning member 2 with the battery electrode plate 1. The side plate 21 is configured to be in contact with the current collector 11 to isolate the coating material of the predetermined region 14 in the hollow space 22. The contact of the side plate 21 with the current collector 11 is that the side plate 21 runs through the coating material 12 to come into contact with the current collector 11. The spraying port 3 is arranged/disposed in the hollow space 22. The spraying port 3 is configured to be in communication with a liquid source to spray a liquid onto the coating material of the predetermined region 14, so that fluidity of the coating material of the predetermined region 14 is increased by the liquid. The suction port 4 is located in the hollow space 22. The suction port 4 is configured to be in communication with a vacuum generation device to suck the coating material of the predetermined region 14 away from the current collector 11.

Therefore, because the material removal device for a battery electrode plate includes the positioning member 2, the contact of the side plate 21 with the current collector 11 can separate the coating material to be removed from the coating material not to be removed. In addition, the spraying port in communication with the liquid source can spray liquid on the coating material to be removed. After the coating material is dissolved with the liquid, the viscosity of the dissolved coating material is reduced, thereby facilitating suction. Because the spraying port 3 is arranged/disposed in the hollow space 22 and the side plate 21 isolates the coating material to be removed from the coating material not to be removed, the sprayed liquid does not come into contact with the region not requiring removal of the coating material, i.e., the coating material not to be removed is not affected by the liquid. Therefore, the coating material of the predetermined region 14 can be accurately removed without affecting the coating material not to be removed, thereby improving the precision of material removal. Furthermore, the suction port 4 arranged/disposed in the hollow space 22 only sucks the coating material of the predetermined region 14 isolated in the hollow space 22 away from the current collector 11, and does not affect the coating material that is outside the hollow space 22 and does not need to be removed, so as not to affect the subsequent usage effect of the battery electrode plate 1.

In one embodiment, as shown in FIG. 3 or FIG. 4, a suction pipe 5 is arranged/disposed in the side plate 21, and the side plate 21 includes an inner side plate 211 adjacent to the hollow space 22 and an outer side plate 212 away from the hollow space 22. The suction port 4 has a suction port surface 42 enclosing a channel 41 in communication with the hollow space 22. The suction port surface 42 is at least partially of a bell shape having an opening facing the hollow space 22.

In an embodiment of the present disclosure, the suction port 4 is located in the coating material 12, and a distance between the current collector 11 and a portion of the suction port 4 away from the side plate 21 is greater than a distance between the current collector 11 and a portion of the suction port 4 close to the side plate 21.

In other words, a plane where a feeding position of the suction port 4 lies is not parallel to the current collector 11, but forms an angle with the current collector 11. Compared with a case where the feeding position of the suction port is parallel to the current collector 11, such a configuration can increase the feeding amount at the feeding position, i.e., facilitate the feeding of the coating material to the suction port.

As shown in FIG. 3 and FIG. 4, in an embodiment of the present disclosure, the positioning member 2 further includes a top plate 23, the side plate 21 is arranged/disposed at a periphery of the top plate 23 to form the hollow space 22, and the side plate 21 is configured to be in contact with the current collector 11 to seal the hollow space 22.

In other words, the top plate 23 and the side plate 21 form the hollow space 22 having an opening at one end. When the side plate 21 is in contact with the current collector 11, the current collector 11 can seal the opening, and the coating material 12 of the predetermined region 14 is also isolated at the opening.

In an embodiment of the present disclosure, a suction pipe 5 is arranged/disposed in the side plate 21. The suction pipe 5 is formed with a first discharge port on a side of the side plate 21 close to the battery electrode plate 1. The suction pipe 5 is formed with a second discharge port on a side of the side plate away from the battery electrode plate 1. The first discharge port is in communication with the suction port 4. The second discharge port is configured to be in communication with the vacuum generation device. Under the action of the vacuum generation device, the coating material of the predetermined region 14 is sucked away from the current collector 11 through the suction port 4 and the suction pipe 5.

As shown in FIG. 4, in an embodiment of the present disclosure, a suction pipe 5 is arranged/disposed in the side plate 21, the side plate 21 includes an inner side plate 211 adjacent to the hollow space 22 and an outer side plate 212 away from the hollow space 22, and the inner side plate 211 and the outer side plate 212 are spaced apart to form the suction pipe 5. In other words, the inner side plate 211 and the outer side plate 212 are spaced apart by a distance. The hollow space 22 is defined by the outer side plate 212. The inner side plate 211 is arranged/disposed in the hollow space 22 around the outer side plate 212. A beam 213 is arranged/disposed at one end of the inner side plate 211 and the outer side plate 212 away from the battery electrode plate 1. The beam 213 is configured to connect the inner side plate 211 and the outer side plate 212. A space is defined by the inner side plate 211, the outer side plate 212, and the beam 213 and has an opening at each of two ends is the suction pipe 5. Arrows in the suction pipe 5 in the figures represent a direction in which the coating material is sucked away.

Further, the suction pipe 5 is formed with a second discharge port on the beam 213. The second discharge port is configured to be in communication with the vacuum generation device. The suction pipe 5 is formed with a first discharge port at one end thereof close to the battery electrode plate 1, i.e., at a position where the inner side plate 211 can come into contact with the coating material 12. The first discharge port is the suction port 4.

Further, an end of the inner side plate 211 close to the battery electrode plate 1 and an end of the outer side plate 212 close to the battery electrode plate 1 together form the suction port 4. The openings of the suction pipe 5 that are defined by the inner side plate 211, the outer side plate 212, and the beam 213 are the second discharge ports. The end of the outer side plate 212 close to the battery electrode plate 1 is configured to be in contact with the current collector 11 to isolate the coating material of the predetermined region 14 in the hollow space 22. The end of the inner side plate 211 close to the battery electrode plate 1 is configured to be in contact with a surface of the coating material 12 of the predetermined region 14 away from the current collector.

In some embodiments, at one end of the side plate 21 close to the battery electrode plate 1, the outer side plate 212 and the inner side plate 211 are not flush, but instead, the outer side plate 212 protrudes from the inner side plate 211. When the positioning member 2 is used for locating the coating material of the predetermined region 14, the outer side plate 212 is in contact with the current collector 11. The inner side plate 211 is short and cannot come into contact with the current collector 11, but can come into contact with the coating material 12. The inner side plate may be in contact with the surface of the coating layer away from the current collector 11, or may be inserted into the coating layer to come into contact with the coating material, as long as the inner side plate is not in contact with the current collector 11. In an embodiment, the inner side plate 211 is in contact with the surface of the coating layer.

Through the formation of the suction port 4 at the end of the side plate 21 close to the battery electrode plate 1 by designing a height difference between the inner side plate 211 and the outer side plate 212, no suction port 4 needs to be separately provided in the hollow space 22, thereby reducing the number of components and simplifying the device configuration. In addition, because the inner side plate 211 is not in contact with the current collector 11 and is in contact with the coating material 12, the coating material can be effectively sucked away from the surface of the current collector. The contact of the inner side plate 211 with the surface of the coating material 12 allows a sufficiently large area of the suction port 4, so that the coating material 12 can be efficiently and rapidly sucked away. In addition, because an end surface of the inner side plate 211 close to the battery electrode plate 1 is not parallel to the battery electrode plate 1, i.e., the end surface of the inner side plate 211 close to the battery electrode plate 1 is closer to the battery electrode plate 1 than an end surface of the inner side plate 211 away from the outer side plate 212 is, the feeding amount can be increased, i.e., the feeding of the coating material to the suction port is facilitated.

As shown in FIG. 3, in an embodiment of the present disclosure, the top plate 23 and the side plate 21 are both provided with a suction pipe 5. The suction pipe 5 includes an inner wall and an outer wall. The side plate 21 includes an inner side plate 211 adjacent to the hollow space 22 and an outer side plate 212 away from the hollow space 22. The top plate 23 includes an inner top plate 231 close to the hollow space 22 and an outer top plate 232 away from the hollow space 22. The inner side plate 211 and the inner top plate 231 are connected to form the inner wall of the suction pipe 5. The outer side plate 212 and the outer top plate 232 are connected to form the outer wall of the suction pipe 5. The suction pipe 5 and the suction port 4 are in communication with the vacuum generation device through the suction pipe 5 to suck the coating material 12 of the predetermined region 14 away from the current collector 11.

As shown in FIG. 3, in an embodiment of the present disclosure, a main spraying pipe 6 is arranged/disposed in the top plate, and the material removal device for a battery electrode plate further includes a spraying plate 7. The spraying plate 7 is arranged/disposed in the hollow space 22. A plurality of spraying pipes 8 in communication with the main spraying pipe 6 are arranged/disposed in the spraying plate 7. The spraying port 3 is formed on one side of the plurality of spraying pipes 8 away from the main spraying pipe 6. The spraying port 3 is in communication with the liquid source through the main spraying pipe 6 and the plurality of spraying pipes 8 to spray the liquid on the coating material of the predetermined region 14.

Further, the spraying plate 7 is disposed opposite to the battery electrode plate 1, and the spraying port 3 is located on a side of the spraying plate 7 close to the battery electrode plate 1.

Further, the spraying plate 7 is provided with a plurality of spraying ports 3.

In other words, in this embodiment, the spraying plate 7 is similar to a shower head in daily life and has a plurality of spraying ports 3, so that the spraying efficiency can be improved. In an embodiment, the spraying plate 7 is arranged/disposed in parallel with the battery electrode plate 1, so that the liquid sprayed from the spraying plate 7 can be sprayed on the coating material of the predetermined region 14. In this way, all the coating material 12 in the predetermined region 14 can quickly come into contact with the sprayed liquid, thereby improving the efficiency of dissolving the coating material of the predetermined region 14.

As shown in FIG. 4, in an embodiment of the present disclosure, a main spraying pipe 6 is arranged/disposed in the top plate 23, the main spraying pipe 6 is formed with the spraying port 3 on one side of the top plate 23 close to the battery electrode plate 1, and the spraying port 3 is in communication with the liquid source through the main spraying pipe 6 to spray the liquid on the coating material of the predetermined region 14.

In the present application, the side plate 21 is in contact with the current collector 11 of the battery electrode plate, and the shape and size of the region defined by the side plate 21 on the battery electrode plate 1 are determined by the pre-designed shape and size of the coating material to be removed from the battery electrode plate. In the related art, the tab 13 soldered to the current collector 11 includes a tab body and a tab adhesive. One portion of the tab body is soldered to the current collector 11, and the other portion of the tab body extends beyond the current collector 11. The portion of the tab body soldered to the current collector 11 is usually rectangular, so the region defined by the side plate 21 on the battery electrode plate 1 is rectangular in shape. An area of the region defined is larger than an area of the portion of the tab body soldered to the current collector.

Figure 5:
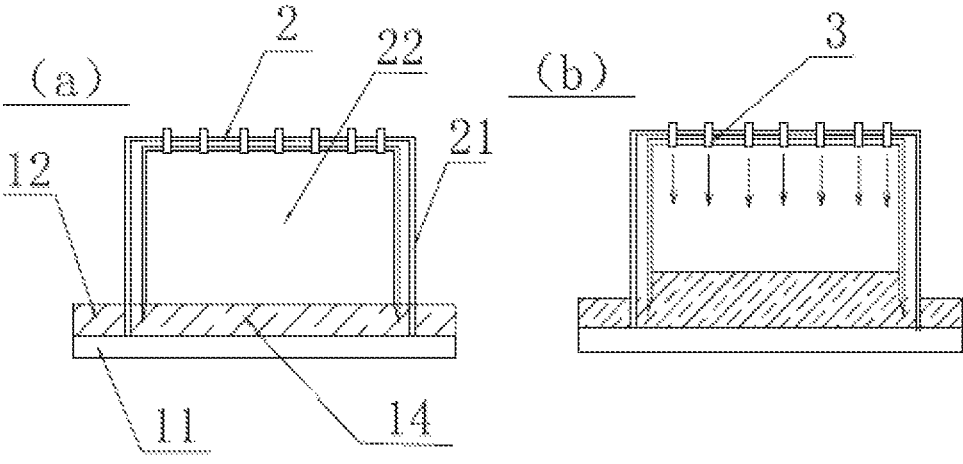
FIG. 5 is a schematic diagram of a material removal method for a battery electrode plate according to an embodiment of the present application.
Figure 5:
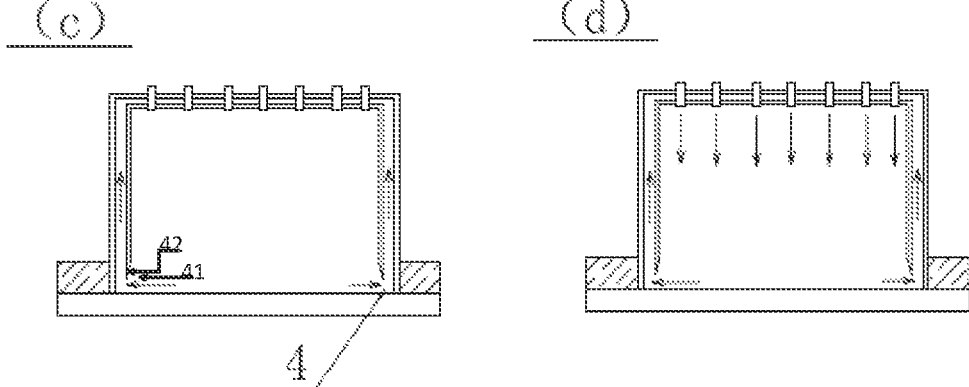

On the other hand, as shown in FIG. 5, the present application further provides a material removal method for a battery electrode plate, for removing a coating material of a predetermined region of a battery electrode plate by the material removal device for a battery electrode plate. The method includes the following steps.

Step 1: Locating of a region requiring material removal. As shown in (a) of FIG. 5, the positioning member 2 is placed in the predetermined region 14 of the battery electrode plate 1, i.e., a region requiring removal of the coating material, so that the side plate 21 passes through the coating material 12 to come into contact with the current collector 11, to isolate the coating material of the predetermined region 14 in the hollow space 22, i.e., the coating material of the predetermined region 14 is enclosed in the hollow space 22 by the side plate 21.

The arrangement/configuration of the side plate 21 allows for the separate isolation of the predetermined region 14, so that the to be removed coating material A and the not to be removed coating material B can be separated from each other, to prevent the coating material B from being removed during the removal of coating material A and resulting in a failure of electrode plate preparation. Therefore, the skillful design and use of the side plate 21 improves the accuracy of removing the coating material of the predetermined region of the battery electrode plate, and improves the yield of preparation of the battery electrode plate.

Step 2: Liquid spraying. As shown in (b) of FIG. 5, after the coating material of the predetermined region 14 is located and isolated, a spraying procedure needs to be started. The spraying port 3 located in the hollow space 22 is configured to be in communication with the liquid source, and the liquid can be sprayed from the spraying port 3 to the hollow space 22, to fully contact with the coating material of the predetermined region 14. Arrows in the figures represent a direction in which the liquid is sprayed.

Because the side plate 21 in step 1 has separated the coating material of the predetermined region 14, the liquid sprayed from the spraying port 3 does not come into contact with the coating material outside the predetermined region, and only the coating material of the predetermined region 14 can come into contact with the liquid. The liquid dissolves the coating material of the predetermined region 14, to reduce the viscosity of the coating material and increase the fluidity of the coating material of the predetermined region 14, thereby facilitating suction and removal.

Step 3: Suction of coating material. As shown in (c) of FIG. 5, after the liquid sprayed in step 2 dissolves the coating material of the predetermined region 14, a suction procedure may be started. The suction port 4 located in the hollow space 22 is connected with a vacuum generation device, and the coating material of the predetermined region 14 can be sucked away through the suction port 4 under a negative pressure. Arrows in the figures represent a direction in which the coating material is sucked away.

Due to the presence of the side plate 21 and because only the coating material of the predetermined region 14 is dissolved by the liquid and has enhanced fluidity, only the coating material of the predetermined region 14 is sucked away when the suction is carried out at the suction port 4, and the coating material outside the predetermined region is not affected.

To ensure that the coating material of the predetermined region can be sucked completely, further, as shown in (d) of FIG. 5, after the coating material of the predetermined region is sucked away in step 3, step 4 may further be performed to clean the predetermined region 14. After step 3 is completed, the spraying procedure is started again to distribute the liquid sprayed from the spraying port 3 onto the current collector in the predetermined region 14 to dissolve any residue of coating material in the predetermined region 14, and a suction program is started at the same time to suck away the liquid on the current collector 11 in the predetermined region 14, thereby realizing the further cleaning of the predetermined region 14. Arrows in the figure respectively represent a direction in which the liquid is sprayed and a direction in which the liquid is sucked away.

After the cleaning in step 4 is completed, it can be ensured that the coating material of the predetermined region 14 has been all removed, and the surface of the current collector in the predetermined region can be sufficiently clean to facilitate soldering of the tab.

In an embodiment, in step 2, the liquid may be sprayed 1 to 3 g per square centimeter on the portion of the coating material of the predetermined region.

In an embodiment, in step 3, the vacuum generation device is configured to vacuum the hollow space to reach a pressure of, for example, about 50 to about 300 KPa.

In an embodiment, in step 4, the liquid may be sprayed 1 to 3 g per square centimeter in the predetermined region. The vacuum generation device is configured to vacuum the hollow space to reach such a pressure, for example, 50 to 300 KPa.

In an embodiment, in step 1, the battery electrode plate 1 is a battery electrode plate whose surface coating material is not dried. The undried coating material can be more easily dissolved by the liquid sprayed from the spraying port, and be more easily sucked away.

In an embodiment, after the above operations, the battery electrode plate may be dried.

In an embodiment, the liquid may be an organic solvent. The organic solvent is selected from at least one of an ester solvent or an ether solvent. The ester solvent may be selected from at least one of vinyl carbonate, propylene carbonate, dimethyl carbonate, diethyl carbonate, methyl ethyl carbonate, ethyl acetate, methyl acetate, ethyl propionate, methyl propionate, propyl propionate, or butyrolactone. The ether solvent may be selected from at least one of ether, tetrahydrofuran, or furan.

Example 1

This embodiment is an embodiment of assembly of a lithium-ion battery. In this embodiment, the current collector was an aluminum foil, and the coating material was a positive electrode active slurry.

Preparation of positive electrode active slurry: Lithium cobaltate, conductive carbon, and PVDF were mixed in NMP (N-methyl-2-pyrrolidone) at a mass ratio of 97:1.5:1.5, and uniformly mixed by mechanical stirring to prepare the slurry. The viscosity of the positive electrode active slurry was 5000 cp, and the solid content of the slurry was 80%.

Preparation of positive electrode plate: The positive electrode active slurry was coated on the aluminum foil. The obtained areal density was 14 mg/cm$^2$.

Removal of coating material of the predetermined region: The coating material of the predetermined region of the positive electrode plate was removed by using the material removal device for a battery electrode plate according to the present application. The positioning member was moved, so that the side plate passed through the coating layer and came into contact with the current collector. A spraying procedure was started, to spray 1.5 g of NMP on per square centimeter of the coating material of the predetermined region. After a wait time of 1 s, a vacuum generation device was started. The pressure of the vacuum generation device was set to 90 KPa. The pressure was held for 3 s to suck away the coating material of the predetermined region. The spraying procedure was started again, to spray 1.5 g of NMP on per square centimeter of the predetermined region. At the same time, the vacuum generation device was started. The pressure was held for 1 s, thus completing the cleaning of the current collector in the predetermined region.

The tab was soldered in the predetermined region of the prepared positive electrode plate, and a lithium-ion battery was assembled.

Example 2

This embodiment is another embodiment of assembly of a lithium-ion battery. In this embodiment, the current collector was an aluminum foil, and the coating material was a positive electrode active slurry.

Preparation of positive electrode active slurry: Lithium cobaltate, conductive carbon, and PVDF were mixed in NMP (N-methyl-2-pyrrolidone) at a mass ratio of 90:5:5, and uniformly mixed by mechanical stirring to prepare the slurry. The viscosity of the positive electrode active slurry was 3000 cp, and the solid content of the slurry was 60%.

Preparation of positive electrode plate: The positive electrode active slurry was coated on the aluminum foil. The obtained areal density was 11 mg/cm$^2$.

Removal of coating material of the predetermined region: The coating material of the predetermined region of the positive electrode plate was removed by using the material removal device for a battery electrode plate according to the present application. The positioning member was moved, so that the side plate passed through the coating layer and came into contact with the current collector. A spraying procedure was started, to spray 1 g of NMP on per square centimeter of the coating material of the predetermined region. After a wait time of 0.5 s, a vacuum generation device was started. The pressure of the vacuum generation device was set to 200 KPa. The pressure was held for 0.5 s to suck away the coating material of the predetermined region. The spraying procedure was started again, to spray 1.5 g of NMP on per square centimeter of the predetermined region. At the same time, the vacuum generation device was started. The pressure was held for 1 s, thus completing the cleaning of the current collector in the predetermined region.

The tab was soldered in the predetermined region of the prepared positive electrode plate, and a lithium-ion battery was assembled.

Example 3

This embodiment is another embodiment of assembly of a lithium-ion battery. In this embodiment, the current collector was an aluminum foil, and the coating material was a positive electrode active slurry.

Preparation of positive electrode active slurry: Lithium cobaltate, conductive carbon, and PVDF were mixed in NMP (N-methyl-2-pyrrolidone) at a mass ratio of 99:0.5:0.5, and uniformly mixed by mechanical stirring to prepare the slurry. The viscosity of the positive electrode active slurry was 7000 cp, and the solid content of the slurry was 85%.

Preparation of positive electrode plate: The positive electrode active slurry was coated on the aluminum foil. The obtained areal density was 17 mg/cm$^2$.

Removal of coating material of the predetermined region: The coating material of the predetermined region of the positive electrode plate was removed by using the material removal device for a battery electrode plate according to the present application. The positioning member was moved, so that the side plate passed through the coating layer and came into contact with the current collector. A spraying procedure was started, to spray 3 g of NMP on per square centimeter of the coating material of the predetermined region. After a wait time of 3 s, a vacuum generation device was started. The pressure of the vacuum generation device was set to 90 KPa. The pressure was held for 3 s to suck away the coating material of the predetermined region. The spraying procedure was started again, to spray 1.5 g of NMP on per square centimeter of the predetermined region. At the same time, the vacuum generation device was started. The pressure was held for 1 s, thus completing the cleaning of the current collector in the predetermined region.

The tab was soldered in the predetermined region of the prepared positive electrode plate, and a lithium-ion battery was assembled.

Example 4

This embodiment is another embodiment of assembly of a lithium-ion battery. In this embodiment, the current collector was a copper foil, and the coating material was a negative electrode active slurry.

Preparation of negative electrode active slurry: Graphite, conductive carbon, styrene butadiene rubber, and sodium carboxymethyl cellulose were added into deionized water at a mass ratio of 96:1.5:1.5:1.0, and uniformly mixed by mechanical stirring to prepare the slurry. The viscosity of the negative electrode active slurry was 3500 cp, and the solid content of the slurry was 80%.

Preparation of negative electrode plate: The negative electrode active slurry was coated on the copper foil. The obtained areal density was 8 mg/cm$^2$.

Removal of coating material of the predetermined region: The coating material of the predetermined region of the negative electrode plate was removed by using the material removal device for a battery electrode plate according to the present application. The positioning member was moved, so that the side plate passed through the coating layer and came into contact with the current collector. A spraying procedure was started, to spray 1 g of NMP on per square centimeter of the coating material of the predetermined region. After a wait time of 3 s, a vacuum generation device was started. The pressure of the vacuum generation device was set to 100 KPa. The pressure was held for is to suck away the coating material of the predetermined region. The spraying procedure was started again, to spray 1 g of NMP on per square centimeter of the predetermined region. At the same time, the vacuum generation device was started. The pressure was held for is, thus completing the cleaning of the current collector in the predetermined region.

The tab was soldered in the predetermined region of the prepared negative electrode plate, and a lithium-ion battery was assembled.

Example 5

This embodiment is another embodiment of assembly of a lithium-ion battery. In this embodiment, the current collector was a copper foil, and the coating material was a negative electrode active slurry.

Preparation of negative electrode active slurry: Graphite, conductive carbon, styrene butadiene rubber, and sodium carboxymethyl cellulose were added into deionized water at a mass ratio of 90:3.5:3.5:3.0, and uniformly mixed by mechanical stirring to prepare the slurry. The viscosity of the negative electrode active slurry was 2000 cp, and the solid content of the slurry was 60%.

Preparation of negative electrode plate: The positive electrode active slurry was coated on the copper foil. The obtained areal density was 6 mg/cm$^2$.

Removal of coating material of the predetermined region: The coating material of the predetermined region of the negative electrode plate was removed by using the material removal device for a battery electrode plate according to the present application. The positioning member was moved, so that the side plate passed through the coating layer and came into contact with the current collector. A spraying procedure was started, to spray 0.2 g of NMP on per square centimeter of the coating material of the predetermined region. After a wait time of 0.2 s, a vacuum generation device was started. The pressure of the vacuum generation device was set to 300 KPa. The pressure was held for 0.3 s to suck away the coating material of the predetermined region. The spraying procedure was started again, to spray 1 g of NMP on per square centimeter of the predetermined region. At the same time, the vacuum generation device was started. The pressure was held for is, thus completing the cleaning of the current collector in the predetermined region.

The tab was soldered in the predetermined region of the prepared negative electrode plate, and a lithium-ion battery was assembled.

Example 6

This embodiment is another embodiment of assembly of a lithium-ion battery. In this embodiment, the current collector was a copper foil, and the coating material was a negative electrode active slurry.

Preparation of negative electrode active slurry: Graphite, conductive carbon, styrene butadiene rubber, and sodium carboxymethyl cellulose were added into deionized water at a mass ratio of 98:0.7:0.7:0.6, and uniformly mixed by mechanical stirring to prepare the slurry. The viscosity of the negative electrode active slurry was 6000 cp, and the solid content of the slurry was 80%.

Preparation of negative electrode plate: The positive electrode active slurry was coated on the copper foil. The obtained areal density was 10 mg/cm$^2$.

Removal of coating material of the predetermined region: The coating material of the predetermined region of the negative electrode plate was removed by using the material removal device for a battery electrode plate according to the present application. The positioning member was moved, so that the side plate passed through the coating layer and came into contact with the current collector. A spraying procedure was started, to spray 2 g of NMP on per square centimeter of the coating material of the predetermined region. After a wait time of 3 s, a vacuum generation device was started. The pressure of the vacuum generation device was set to 100 KPa. The pressure was held for is to suck away the coating material of the predetermined region. The spraying procedure was started again, to spray 1 g of NMP on per square centimeter of the predetermined region. At the same time, the vacuum generation device was started. The pressure was held for 1 s, thus completing the cleaning of the current collector in the predetermined region.

The tab was soldered in the predetermined region of the prepared negative electrode plate, and a lithium-ion battery was assembled.

Comparative Example 1

This comparative example is the same as Example 3 except that the coating material of the predetermined region of the positive electrode plate was removed using a laser cleaning device.

Comparative Example 2

This comparative example is the same as Example 6 except that the coating material of the predetermined region of the negative electrode plate was removed using a laser cleaning device.

Testing (1) Testing of Residue of the Coating Material of the Predetermined Region of the Battery Electrode Plate and Testing of Damage to the Surface of the Current Collector in the Predetermined Region The positive and negative electrode plates prepared in Examples 1 to 6 and Comparative Examples 1 to 2 were observed with a 30-fold magnifying glass for the residue of the coating material of the predetermined region and damage to the current collector in the predetermined region. The test results were as shown in Table 1.

(2) Capacity Test of Lithium Ion Battery

Battery capacity testing was performed on the lithium-ion batteries prepared in Examples 1 to 6 and Comparative Examples 1 to 2. Each of the lithium-ion batteries was first allowed to stand for 3 min, then charged to 4.3 V at a charging current of 0.5 C, and then charged to 0.05 C at a constant voltage. A first charging capacity AGCO was obtained. Afterward, each of the lithium-ion batteries was allowed to stand for 3 min, and then discharged to 3.0 V at a constant discharge current of 0.5 C. A first discharge capacity DO was obtained. Each of the lithium-ion batteries was then allowed to stand for 3 min, and the capacity of the lithium-ion battery was tested. The test results were as shown in Table 1.

TABLE 1

| | AGC0/mAh | D0/mAh | Damage to current collector | Residue of coating material |
|---|---|---|---|---|
| Example 1 | 4090 | 4081 | None | None |
| Example 2 | 4087 | 4072 | None | None |
| Example 3 | 4091 | 4085 | None | None |
| Example 4 | 4095 | 4091 | None | None |
| Example 5 | 4075 | 4063 | None | None |
| Example 6 | 4079 | 4076 | None | None |
| Comparative Example 1 | 2656 | 2521 | Obvious | Little |
| Comparative Example 2 | 3089 | 3048 | Slight | Little |

It can be seen from the test results in Table 1 that, compared with conventional methods for removing the coating material of the battery electrode plate, when the material removal device and method for a battery electrode plate according to the present application were used to remove the coating material from the positive electrode plates and the negative electrode plates, the amount of residual coating material on the surface of the current collector in the predetermined region was small, and the damage to the current collector after material removal was also small. Therefore, high battery performance can be achieved when such battery electrode plates are used to assemble a battery.

The foregoing descriptions are merely some embodiments of the present application, but do not limit the present application. Any modification, equivalent replacement, or improvement made within the spirit and principle of the present application shall fall within the protection scope of the present application.

What is claimed is:

1. A device for removing a coating material from a battery electrode plate, the battery electrode plate comprising a current collector and the coating material attached to a surface of the current collector, the device comprising:
   a housing, comprising a side plate, a hollow space being defined by the side plate, the side plate being configured to be in contact with the current collector and to isolate a portion of the coating material in the hollow space;
   a spraying port, located in the hollow space and configured to be in communication with a liquid source to spray a liquid onto the portion of the coating material to dissolve the portion of the coating material; and
   a suction port, located in the hollow space and configured to be in communication with a vacuum generation device to suck the dissolved coating material away from the current collector, wherein
   the side plate comprises an inner side plate and an outer side plate, the inner side plate and the outer side plate are spaced apart to form a suction pipe, the suction pipe is in communication with the suction port, and one end of the outer side plate close to the battery electrode plate is configured to be in contact with the current collector.

2. The device according to claim 1, wherein the housing further comprises a top plate, the side plate is disposed at a periphery of the top plate, and the side plate is configured to be in contact with the current collector to seal the hollow space.

3. The device according to claim 2, wherein the top plate comprises an inner top plate and an outer top plate, the inner side plate is connected to the inner top plate to form an inner wall of the suction pipe, the outer side plate is connected to the outer top plate to form an outer wall of the suction pipe, the inner wall of the suction pipe and the outer wall of the suction pipe form the suction pipe, the suction pipe is in communication with the suction port, and the one end of the outer side plate close to the battery electrode plate is configured to be in contact with the current collector to seal the hollow space.

4. The device according to claim 2, wherein a main spraying pipe is disposed in the top plate, the spraying port is formed on one side of the top plate close to the battery electrode plate, and the spraying port is in communication with the liquid source through the main spraying pipe to spray the liquid on the portion of the coating material.

5. The device according to claim 4, further comprising a spraying plate, the spraying plate being disposed in the hollow space, a plurality of spraying pipes in communication with the main spraying pipe being disposed in the spraying plate, and the spraying port being formed on one end of each of the spraying pipes away from the main spraying pipe.

6. The device according to claim 1, wherein the suction port has a suction port surface enclosing a channel in communication with the hollow space, and the suction port surface is at least partially of a bell shape having an opening facing the hollow space.

7. The device according to claim 1, wherein one end of the suction pipe close to the battery electrode plate forms the suction port.

8. The device according to claim 1, wherein one end of the inner side plate close to the battery electrode plate is configured to be in contact with the portion of the coating material and is spaced apart from the current collector to form the suction port.

9. The device according to claim 8, wherein a first distance between a first portion of the suction port away from the inner side plate and the current collector is greater than a second distance between a second portion of the suction port close to the inner side plate and the current collector.

10. The device according to claim 1, wherein one end of the inner side plate close to the battery electrode plate is configured to be in contact with the portion of the coating material away from the current collector.

11. A method for removing a coating material from a battery electrode plate by a device, the battery electrode plate comprising a current collector and the coating material attached to a surface of the current collector, wherein the device comprises:
   a housing, comprising a side plate, a hollow space being defined by the side plate, the side plate being configured to be in contact with the current collector;
   a spraying port, located in the hollow space and configured to be in communication with a liquid source; and
   a suction port, located in the hollow space and configured to be in communication with a vacuum generation device, wherein
   the side plate comprises an inner side plate and an outer side plate, the inner side plate and the outer side plate are spaced apart to form a suction pipe, the suction pipe is in communication with the suction port, and one end of the outer side plate close to the battery electrode plate is configured to be in contact with the current collector; and the method comprises:

placing the housing on the battery electrode plate, isolating a portion of the coating material in the hollow space by the side plate;

spraying a liquid through the spraying port in the hollow space onto the portion of the coating material to dissolve the portion of the coating material; and sucking the dissolved coating material away from the current collector through the suction port.

12. The method according to claim 11, wherein after the sucking the dissolved coating material away from the current collector through the suction port, the method further comprises:

spraying the liquid on the current collector from which the dissolved coating material is sucked away, and sucking the liquid away from the current collector through the suction port.

13. The method to claim 12, wherein after the spraying the liquid on the current collector from which the dissolved coating material is sucked away, and sucking the liquid away from the current collector through the suction port, the method further comprises:

drying the battery electrode plate.

14. The method according to claim 11, wherein the spraying the liquid through the spraying port in the hollow space onto the portion of the coating material to dissolve the coating material comprises spraying 1 g to 3 g of the liquid per square centimeter on the coating material.

15. The method according to claim 11, wherein a pressure in the hollow space is about 50 KPa to about 300 KPa.

16. The method according to claim 11, wherein the housing further comprises a top plate, the side plate is disposed at a periphery of the top plate, and the side plate is configured to be in contact with the current collector to seal the hollow space.

17. The method according to claim 16, wherein the top plate comprises an inner top plate and an outer top plate, the inner side plate is connected to the inner top plate to form an inner wall of the suction pipe, the outer side plate is connected to the outer top plate to form an outer wall of the suction pipe, the inner wall of the suction pipe and the outer wall of the suction pipe form the suction pipe, the suction pipe is in communication with the suction port, and the one end of the outer side plate close to the battery electrode plate is configured to be in contact with the current collector to seal the hollow space.

18. The method according to claim 11, wherein the suction port has a suction port surface enclosing a channel in communication with the hollow space, and the suction port surface is at least partially of a bell shape having an opening facing the hollow space.

\* \* \* \* \*